(12) United States Patent
Guo et al.

(10) Patent No.: US 10,055,583 B2
(45) Date of Patent: Aug. 21, 2018

(54) METHOD AND APPARATUS FOR PROCESSING FILE

(71) Applicant: Baidu Online Network Technology (Beijing) Co., Ltd, Beijing (CN)

(72) Inventors: Mingqiang Guo, Beijing (CN); Yongcheng Zhang, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 200 days.

(21) Appl. No.: 14/587,927

(22) Filed: Dec. 31, 2014

(65) Prior Publication Data

US 2016/0078228 A1 Mar. 17, 2016

(30) Foreign Application Priority Data

Sep. 16, 2014 (CN) .......................... 2014 1 0471868

(51) Int. Cl.
*G06F 21/56* (2013.01)

(52) U.S. Cl.
CPC .......... *G06F 21/561* (2013.01); *G06F 21/562* (2013.01); *G06F 21/564* (2013.01); *G06F 21/568* (2013.01)

(58) Field of Classification Search
CPC ..... H04L 63/145; G06F 21/56; G06F 21/566; G06F 21/564; G06F 21/562; G06F 21/561; G06F 21/568
See application file for complete search history.

(56) References Cited

U.S. PATENT DOCUMENTS

| 6,401,210 B1 * | 6/2002 | Templeton | G06F 21/56 |
| | | | 713/188 |
| 7,409,717 B1 * | 8/2008 | Szor | G06F 21/566 |
| | | | 711/109 |
| 8,561,180 B1 * | 10/2013 | Nachenberg | G06F 21/577 |
| | | | 726/22 |

(Continued)

FOREIGN PATENT DOCUMENTS

| CN | 101673302 A | 3/2010 |
| CN | 103150504 A | 6/2013 |

(Continued)

*Primary Examiner* — Farid Homayounmehr
*Assistant Examiner* — Sanchit K Sarker
(74) *Attorney, Agent, or Firm* — Orrick, Herrington & Sutcliffe LLP

(57) ABSTRACT

The embodiments of the present invention provide a method and apparatus for processing a file. By means of acquiring a target file to be scanned and then using recognition data of a deletable file to recognize the target file, so as to obtain a recognition result, the recognition result comprising the target file being a deletable file, the target file being an undeletable file or the target file being an unknown file, the embodiments of the present invention enable the deletion of the deletable file according to the recognition result. Since the recognized deletable file can be directly deleted without the need to perform virus scanning processing thereon and then pop up a corresponding alarm prompt regarding a confirmed virus file to remind a user to delete the virus file, the occupation of system resources of a terminal can be reduced, thereby improving the processing performance of the terminal.

18 Claims, 1 Drawing Sheet

(56) References Cited

U.S. PATENT DOCUMENTS

Figure 1:
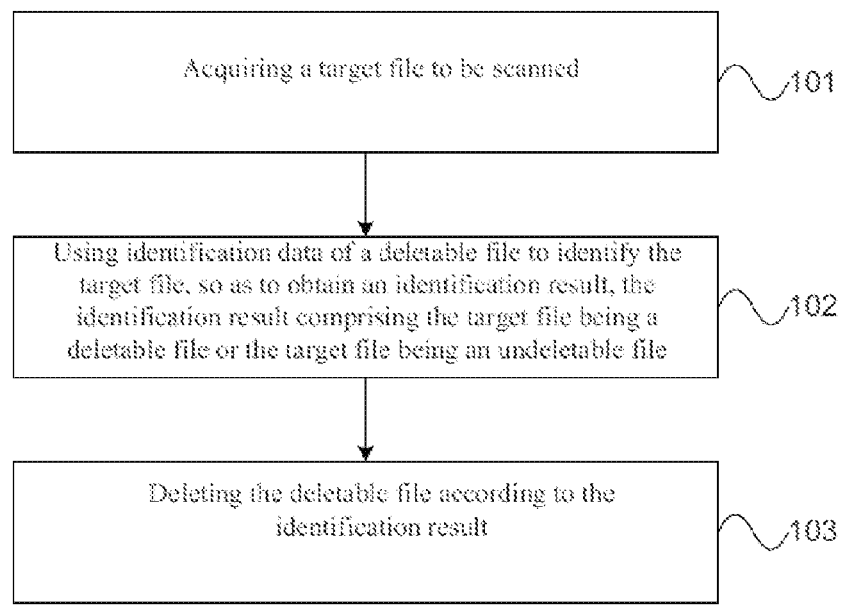

| | | | | |
|---|---|---|---|---|
| 8,813,222 B1* | 8/2014 | Codreanu | G06F 21/56 | 726/22 |
| 2003/0105973 A1* | 6/2003 | Liang | G06F 21/56 | 726/24 |
| 2005/0273476 A1* | 12/2005 | Wertheimer | G06F 11/1458 | |
| 2006/0156382 A1* | 7/2006 | Motoyama | G06F 21/6209 | 726/1 |
| 2007/0240222 A1* | 10/2007 | Tuvell | G06F 21/56 | 726/24 |
| 2007/0283438 A1* | 12/2007 | Fries | G06F 21/562 | 726/24 |
| 2008/0282349 A1* | 11/2008 | Koui | G06F 21/56 | 726/24 |
| 2010/0100963 A1* | 4/2010 | Mahaffey | G06F 21/564 | 726/25 |
| 2011/0107424 A1* | 5/2011 | Singh | G06F 17/30109 | 726/24 |
| 2011/0258165 A1* | 10/2011 | Jung | G06F 21/568 | 707/687 |
| 2012/0102477 A1* | 4/2012 | Kim | G06F 8/654 | 717/169 |
| 2013/0074178 A1* | 3/2013 | Sobol | G06F 21/56 | 726/17 |
| 2013/0312100 A1* | 11/2013 | Wang | G06F 21/562 | 726/24 |
| 2015/0096024 A1* | 4/2015 | Haq | H04L 63/145 | 726/23 |
| 2015/0288707 A1* | 10/2015 | Liu | H04L 63/145 | 726/24 |
| 2015/0379119 A1* | 12/2015 | Chen | G06F 17/30985 | 707/713 |
| 2017/0032121 A1* | 2/2017 | Kim | G06F 21/56 | |

FOREIGN PATENT DOCUMENTS

| | | |
|---|---|---|
| CN | 103425928 A | 12/2013 |
| JP | 2003-099300 A | 4/2003 |
| JP | 2003-271424 A | 9/2003 |
| JP | 2005-522800 A | 7/2005 |
| JP | 2012-533104 A | 12/2012 |

* cited by examiner

METHOD AND APPARATUS FOR PROCESSING FILE

CROSS-REFERENCE TO RELATED APPLICATIONS

The present application claims priority to Chinese Patent Application No. CN201410471868.X, filed on Sep. 16, 2014, the entire disclosure of which is incorporated herein by reference in its entirety and for all purposes.

TECHNICAL FIELD

The present invention relates to computer technologies, and in particular to a method and apparatus for processing a file.

BACKGROUND

Viruses are data which is compiled or inserted in an application program for destroying terminal functions, and will affect the normal use of the application program, are able to self-replicate, and generally take the form of as a set of instructions or program codes. Viruses have the characteristics of destruction, replication and infection. A terminal may use an antivirus engine to carry out virus scanning processing on a file, so as to immediately discover a virus file. The so-called virus file refers to a file containing a virus. If the antivirus engine discovers a virus file, a corresponding alarm prompt may pop up to remind a user to delete the virus file. After receiving a deletion instruction triggered by the user, the antivirus engine may delete the virus file.

However, due to the replication of the virus, a great number of virus files may be replicated, and a lot of system resources of a terminal may be occupied by using the method in the prior art to carry out virus scanning processing on each file and then pop up a corresponding alarm prompt regarding a confirmed virus file to remind a user to delete the virus file, thus resulting in a reduction in the processing performance of the terminal.

SUMMARY

A plurality of aspects of the present invention provide a method and apparatus for processing a file, so as to improve the processing performance of a terminal.

One aspect of the present invention provides a method for processing a file, comprising:

acquiring a target file to be scanned;

using recognition data of a deletable file to recognize the target file, so as to obtain a recognition result, the recognition result comprising the target file being a deletable file or the target file being an undeletable file; and deleting the deletable file according to the recognition result.

The aspect as mentioned above and any possible implementation further provide an implementation, which, after the step of using recognition data of a deletable file to recognize the target file, so as to obtain a recognition result, further comprises:

performing virus scanning processing on the undeletable file according to the recognition result.

The aspect as mentioned above and any possible implementation further provide an implementation which, before the step of using recognition data of a deletable file to recognize the target file, so as to obtain a recognition result, further comprises:

acquiring a deletion instruction triggered by a user, the deletion instruction being used to instruct the deletion of a virus file; and obtaining the size of the virus file and feature data of the virus file according to the virus file, to serve as the recognition data of the deletable file.

The aspect as mentioned above and any possible implementation further provide an implementation, wherein the step of using recognition data of a deletable file to recognize the target file, so as to obtain a recognition result comprises:

acquiring the size of the target file;

acquiring feature data of the content of a designated portion of the target file if the size of the target file successfully matches with the size of a file in the recognition data;

acquiring feature data of all the contents of the target file if the feature data of the content of the designated portion of the target file successfully matches with feature data of the content of a designated portion of the file in the recognition data; and obtaining the recognition result that the target file is a deletable file if the feature data of all the contents of the target file successfully matches with the feature data of all the contents of the file in the recognition data.

The aspect as mentioned above and any possible implementation further provide an implementation, wherein the step of using recognition data of a deletable file to recognize the target file, so as to obtain a recognition result comprises:

obtaining the recognition result that the target file is an undeletable file if the size of the target file fails to match with the size of the file in the recognition data; or obtaining the recognition result that the target file is an undeletable file if the feature data of the content of the designated portion of the target file fails to match with the feature data of the content of the designated portion of the file in the recognition data; or obtaining the recognition result that the target file is an undeletable file if the feature data of all the contents of the target file fails to match with the feature data of all the contents of the file in the recognition data.

The aspect as mentioned above and any possible implementation further provide an implementation which, before the step of using recognition data of a deletable file to recognize the target file, so as to obtain a recognition result, further comprises:

deleting, according to erroneous alarm information about any one file, the size of the one file and feature data of the one file from the recognition data.

The aspect as mentioned above and any possible implementation further provide an implementation, wherein said acquiring feature data of the content of a designated portion of the target file if the size of the target file successfully matches with the size of a file in the recognition data comprises:

acquiring feature data of the beginning M bytes of the target file using a first Hash algorithm if the size of the target file successfully matches with the size of the file in the recognition data, M being an integer greater than or equal to 1.

The aspect as mentioned above and any possible implementation further provide an implementation, wherein the step of acquiring feature data of all the contents of the target file if the feature data of the content of the designated portion of the target file successfully matches with feature data of the content of a designated portion of the file in the recognition data comprises:

acquiring the feature data of all the contents of the target file using a second Hash algorithm if the feature data of the content of the designated portion of the target file successfully matches with the feature data of the content of the designated portion of the file in the recognition data.

The aspect as mentioned above and any possible implementation further provide an implementation, wherein the target file comprises an executable file or a non-executable file.

Another aspect of the present invention provides an apparatus for processing a file, comprising:

an acquisition unit for acquiring a target file to be scanned;

a recognition unit for using recognition data of a deletable file to recognize the target file, so as to obtain a recognition result, the recognition result comprising the target file being a deletable file or the target file being an undeletable file; and a scanning unit for deleting the deletable file according to the recognition result.

The aspect as mentioned above and any possible implementation further provide an implementation, wherein the scanning unit is further used for performing virus scanning processing on the undeletable file according to the recognition result.

The aspect as mentioned above and any possible implementation further provide an implementation, wherein the recognition unit is further used for acquiring a deletion instruction triggered by a user, the deletion instruction being used to instruct the deletion of a virus file; and obtaining the size of the virus file and feature data of the virus file according to the virus file, to serve as the recognition data of the deletable file.

The aspect as mentioned above and any possible implementation further provide an implementation, wherein the recognition unit is specifically used for acquiring the size of the target file;

acquiring feature data of the content of a designated portion of the target file if the size of the target file successfully matches with the size of a file in the recognition data;

acquiring feature data of all the contents of the target file if the feature data of the content of the designated portion of the target file successfully matches with feature data of the content of a designated portion of the file in the recognition data; and obtaining the recognition result that the target file is a deletable file if the feature data of all the contents of the target file successfully matches with the feature data of all the contents of the file in the recognition data.

The aspect as mentioned above and any possible implementation further provide an implementation, wherein the recognition unit is further used for obtaining the recognition result that the target file is an undeletable file if the size of the target file fails to match with the size of the file in the recognition data; or obtaining the recognition result that the target file is an undeletable file if the feature data of the content of the designated portion of the target file fails to match with the feature data of the content of the designated portion of the file in the recognition data; or obtaining the recognition result that the target file is an undeletable file if the feature data of all the contents of the target file fails to match with the feature data of all the contents of the file in the recognition data.

The aspect as mentioned above and any possible implementation further provide an implementation, wherein the recognition unit is further used for deleting, according to erroneous alarm information about any one file, the size of the one file and feature data of the one file from the recognition data.

The aspect as mentioned above and any possible implementation further provide an implementation, wherein the recognition unit is specifically used for acquiring feature data of the beginning M bytes of the target file using a first Hash algorithm if the size of the target file successfully matches with the size of the file in the recognition data, M being an integer greater than or equal to 1.

The aspect as mentioned above and any possible implementation further provide an implementation, wherein the recognition unit is specifically used for acquiring the feature data of all the contents of the target file using a second Hash algorithm if the feature data of the content of the designated portion of the target file successfully matches with the feature data of the content of the designated portion of the file in the recognition data.

The aspect as mentioned above and any possible implementation further provide an implementation, wherein the target file comprises an executable file or a non-executable file.

It can be seen from the technical solutions mentioned above that by means of acquiring a target file to be scanned and then using recognition data of a deletable file to recognize the target file, so as to obtain a recognition result, the recognition result comprising that the target file is a deletable file, the target file is an undeletable file or the target file is an unknown file, the embodiments of the present invention enable deletion of the deletable file according to the recognition result. Since the recognized deletable file can be directly deleted without the need to perform virus scanning processing thereon and then pop up a corresponding alarm prompt regarding a confirmed virus file to remind a user to delete the virus file, the occupation of system resources of a terminal can be reduced, thereby improving the processing performance of the terminal.

In addition, by using the technical solutions provided by the present invention, since the recognized deletable file can be directly deleted without the need to perform virus scanning processing thereon and then pop up a corresponding alarm prompt regarding a confirmed virus file to remind a user to delete the virus file, frequent popping up of the same alarm prompt can be avoided.

In addition, by using the technical solutions provided by the present invention, since virus scanning processing only needs to be carried out on the recognized undeletable file instead of carrying out virus scanning processing on any file, the efficiency of virus recognition can be effectively improved.

In addition, by using the technical solutions provided by the present invention, by means of deleting, according to erroneous alarm information about any one file, the size of the one file and feature data of the one file from the recognition data to avoid continuing to directly delete the one file subsequently, the reliability of virus recognition can be effectively improved.

BRIEF DESCRIPTION OF THE ACCOMPANYING DRAWINGS

In order to illustrate the technical solutions in the embodiments of the present invention more clearly, the accompanying drawings required to be used in the description of the embodiments or the prior art are briefly introduced below. Clearly, the accompanying drawings in the following description are some embodiments of the present invention, and those of ordinary skill in the art may further obtain other drawings according to these accompanying drawings without making inventive efforts.

Figure 2:
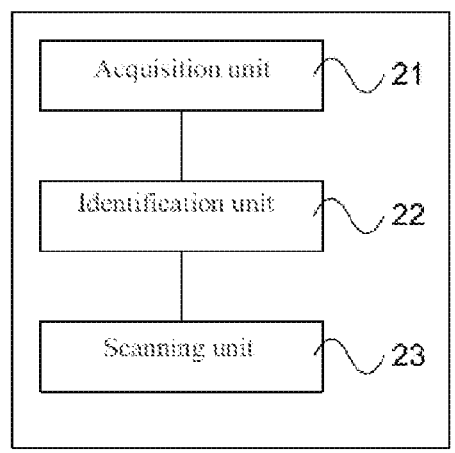

FIG. 1 is a schematic flowchart of a method for processing a file provided in an embodiment of the present invention; and FIG. 2 is a structural schematic diagram of an apparatus for processing a file provided in another embodiment of the present invention.

DETAILED DESCRIPTION OF PREFERRED EMBODIMENTS

In order to make the objectives, technical solutions and advantages of the embodiments of the present invention more clear, the technical solutions in the embodiments of the present invention will be described clearly and completely below in combination with the accompanying drawings in the embodiments of the present invention. Clearly, the described embodiments are some of the embodiments of the present invention rather than all the embodiments. All other embodiments obtained by those of ordinary skill in the art based on the embodiments of the present invention without making inventive efforts are within the scope of protection of the present invention.

It needs to be noted that the terminals involved in the embodiments of the present invention may comprise but are not limited to a mobile phone, a personal digital assistant (PDA), a wireless handheld apparatus, a wireless netbook, a personal computer, a portable computer, an MP3 player, an MP4 player, etc.

In addition, the term "and/or" herein is merely an association relationship describing associated objects, and indicates that three relationships may exist, for example, A and/or B may represent: three cases where A exists alone, A and B exist simultaneously, and B exists alone. In addition, the character "l" herein generally indicates an "or" relationship between associated objects.

FIG. 1 is a schematic flowchart of a method for processing a file provided in an embodiment of the present invention, as shown in FIG. 1.

101, a target file to be scanned is acquired.

102, recognition data of a deletable file is used to recognize the target file, so as to obtain a recognition result, the recognition result comprising the target file being a deletable file or the target file being an undeletable file.

103, the deletable file is deleted according to the recognition result.

It can be understood that the deletable file deleted in 103 is the target file corresponding to the recognition result that the target file is a deletable file.

Viruses, also called computer viruses, may comprise but are not limited to Trojans, backdoors, local area network worms, mail worms, spyware, infective viruses or Rootkits/Bootkits.

It shall be noted that the execution body of 101-103 may be an application located in a local terminal, or may also be a functional unit such as a plug-in or a software development kit (SDK) arranged in the application located in the local terminal, or may also be a processing engine located in a network-side server; this is not particularly limited in this embodiment.

It can be understood that the application may be a native program (nativeAPP) installed on a terminal, or may also be a webpage program (webAPP) of a browser on the terminal; this is not particularly limited in this embodiment.

Thus, by means of acquiring a target file to be scanned and then using recognition data of a deletable file to recognize the target file, so as to obtain a recognition result, the recognition result comprising that the target file is a deletable file, the target file is an undeletable file or the target file is an unknown file, deletion of the deletable file according to the recognition result is made possible. Since the recognized deletable file can be directly deleted without the need to perform virus scanning processing thereon and then pop up a corresponding alarm prompt regarding a confirmed virus file to remind a user to delete the virus file, the occupation of system resources of a terminal can be reduced, thereby improving the processing performance of the terminal.

Optionally, in a possible implementation of this embodiment, the target file to be scanned in 101 may refer to one of a number of files stored in a storage device of a terminal determined according to a scanning range. Specifically, the target files to be scanned may specifically be files sequentially acquired according to a certain scanning sequence from all the files stored in the storage device of the terminal, or may also be files sequentially acquired according to a certain scanning sequence from all the files stored in a specified path of the storage device of the terminal; this is not particularly limited in this embodiment.

In one specific implementation process, the storage device of the terminal may be a slow storage device, and may specifically be a hard disk of a computer system, or may also be a non-running memory of a mobile phone, i.e., a physical memory, e.g. a read-only memory (ROM) and a memory card; this is not particularly limited in this embodiment.

In another specific implementation process, the storage device of the terminal may also be a fast storage device, and may specifically be a memory of a computer system, or may also be a running memory of a mobile phone, i.e., a system memory, e.g. a random access memory (RAM), etc.; this is not particularly limited in this embodiment.

Optionally, in a possible implementation of this embodiment, the target file may be an executable file. Specifically, the executable file is a file of a portable executable (PE) file format, and may also be loaded into a memory and executed by a loading program of an operating system. The filename extension of the executable file may comprise but is not limited to .exe, .sys, .scr, etc.

Optionally, in a possible implementation of this embodiment, the target file may be a non-executable file. Specifically, a non-executable file is a file that is not an executable file.

Optionally, in a possible implementation of this embodiment, after 102, virus scanning processing may also be further performed on the undeletable file according to the recognition result.

It can be understood that in this implementation, the undeletable file on which virus scanning processing is performed is the target file corresponding to the recognition result that the target file is an undeletable file.

Thus, a scanning result may be obtained by carrying out virus scanning processing on an undeletable file, so as to further carry out relevant virus defence processing according to the scanning result, for example, alarm processing of a recognized virus file, or for another example, releasing processing of a file recognized to have no virus, etc.; this is not particularly limited in this embodiment.

It can be understood that the deletable file deleted is the target file corresponding to the recognition result that the target file is a deletable file. Since it can be confirmed that the target file is a deletable file, there is no need to carry out virus scanning processing on the deletable file, and it is deleted directly, and 101 is continuously carried out to obtain the next target file to be scanned. Thus, since it is only necessary to carry out virus scanning processing on the undeletable files, so that virus scanning processing is no longer performed on deletable files, which are directly deleted, the efficiency of virus recognition can be effectively improved.

Optionally, in a possible implementation of this embodiment, before 102, a deletion instruction triggered by a user may also be further acquired, the deletion instruction being used to instruct the deletion of a virus file, and thus the size of the virus file and feature data of the virus file may be obtained according to the virus file, to serve as the recognition data of the deletable file.

Specifically, some existing file recognition algorithms, e.g. feature matching, may specifically be used to recognize a virus file amongst some files; this is not particularly limited in this embodiment. If a virus file is discovered, the antivirus engine may pop up a corresponding alarm prompt to remind a user to delete the virus file. After receiving a deletion instruction triggered by the user, the antivirus engine may delete the virus file.

Since the deletion instruction is triggered by a user, the virus file can be considered as a file which has been confirmed by the user that may be directly deleted, and thus the size of the virus file and the feature data of the virus file serve as the recognition data of the deletable file.

In one specific implementation process, a database is established according to recognition data of some deletable files. The database specifically may comprise but is not limited to the following contents:

the size of a file;
feature data of the content of a designated portion of the file; and
feature data of all the contents of the file.

The size of the file is used for indicating the actual number of bytes of the content of the file; the value thereof specifically may be represented by setting different bit lengths according to the maximum limit of the size of the file, and can usually be represented by 32 digits.

The feature data of the content of a designated portion of the file can be used to reflect characteristics of the content of the designated portion of a file, which are different from those of other files, and the value thereof may specifically be represented by setting different bit lengths according to the type of the first Hash algorithm, and usually 32 digits may be used to represent a hash value calculated by a cyclical redundancy check 32 (CRC32) algorithm.

Generally, the content of the designated portion may be specifically predefined according to the data reading order of the file and the data reading unit of the file. For example, if the data reading unit of the file is a cluster, the default size of one cluster being 4K bytes, then the content of the designated portion of the target file may be defined as the beginning 4K bytes of the file.

The feature data of all the contents of the file is used to reflect characteristics of all the contents of the file, which are different from those of other files and may serve as unique identification of the file, and the value thereof may specifically be represented by setting different bit lengths according to the type of the second Hash algorithm, and usually 128 digits may be used to represent a hash value calculated by a message digest algorithm 5 (MD5).

Furthermore, if the type of the file is a deletable file, the database also needs to further comprise information about a virus name, such as the length of the virus name and the virus name.

In another specific implementation process, in 102, the size of the target file may be specifically acquired. If the size of the target file successfully matches with the size of a file in the recognition data, feature data of the content of a designated portion of the target file may be further acquired. If the feature data of the content of the designated portion of the target file successfully matches with feature data of the content of a designated portion of the file in the recognition data, the feature data of all the contents of the target file may be further acquired. If the feature data of all the contents of the target file successfully matches with the feature data of all the contents of the file in the recognition data, the recognition result that the target file is a deletable file may be obtained.

The feature data of the content of the designated portion of the target file and the feature data of all the contents of the target file may specifically be a static feature, and the so-called static feature may be understood to serve as a recognition basis based on an unexecuted file, or may also be a dynamic feature, and the so-called dynamic feature may be understood to serve as a recognition basis based on an executed file; this is not particularly limited in this embodiment.

Specifically, the first Hash algorithm may be specifically used, for example, an algorithm such as a cyclical redundancy check 32 (CRC32) algorithm, Adler32 or a message digest algorithm 4 (MD4), to acquire feature data of the beginning M bytes of the target file, M being an integer greater than or equal to 1.

Specifically, the second Hash algorithm may be specifically used, for example, an algorithm such as a message digest algorithm 5 (MD5) or a secure Hash algorithm 256 (SHA256), to acquire feature data of all the contents of the target file.

Furthermore, if the size of the target file fails to match with the size of the file in the recognition data, the recognition result that the target file is an undeletable file may be obtained.

Furthermore, if the feature data of the content of the designated portion of the target file fails to match with the feature data of the content of the designated portion of the file in the recognition data, the recognition result that the target file is an undeletable file may be obtained.

Furthermore, if the feature data of all the contents of the target file fails to match with the feature data of all the contents of the file in the recognition data, the recognition result that the target file is an undeletable file may be obtained.

It can be understood that the so-called successful matching may be specifically defined according to matching requirements. Specifically, it may be that data to be matched are completely consistent, i.e., completely matched or accurately matched, or may be that the data to be matched are basically consistent, i.e., not completely matched or approximately matched; this is not particularly limited in this embodiment.

For some reasons, for example, there is a problem with the logic of virus scanning processing, or for another example, a compilation problem of the file per se, etc. some files which are not virus files may be mistakenly recognized as virus files, and thus alarm processing is carried out on these files. That is to say, alarm information generated by the alarm processing carried out on the file is wrong alarm information, i.e., erroneous alarm information. The so-called erroneous alarm information may be specifically collected by various means, for example, an operator carries out manual screening on an alarm record, or for another example, an active feedback from the user, etc. With regard such circumstances, in a possible implementation of this embodiment, before 102, according to erroneous alarm information about any one file, the size of the one file and feature data of the one file may further be deleted from the recognition data.

Specifically, the size of the one file and the feature data of the one file may be specifically matched in the recognition data, and if the matching succeeds, it is indicated that relevant information about the one file has been mistakenly taken as recognition data of a deletable file, so then the size of the one file and the feature data of the one file may be deleted from the recognition data of the deletable file.

Thus, by means of deleting, according to erroneous alarm information about any one file, the size of the one file and feature data of the one file from the recognition data to avoid continuing to directly delete the one file subsequently, the reliability of virus recognition can be effectively improved.

In this embodiment, by means of acquiring a target file to be scanned and then using recognition data of a deletable file to recognize the target file, so as to obtain a recognition result, the recognition result comprising that the target file is a deletable file, the target file is an undeletable file or the target file is an unknown file, deletion of the deletable file according to the recognition result is made possible. Since the recognized deletable file can be directly deleted without the need to perform virus scanning processing thereon and then pop up a corresponding alarm prompt regarding a confirmed virus file to remind a user to delete the virus file, the occupation of system resources of a terminal can be reduced, thereby improving the processing performance of the terminal.

In addition, by using the technical solutions provided by the present invention, since the recognized deletable file can be directly deleted without the need to perform virus scanning processing thereon and then pop up a corresponding alarm prompt regarding a confirmed virus file to remind a user to delete the virus file, frequent popping up of the same alarm prompt can be avoided.

In addition, by using the technical solutions provided by the present invention, since virus scanning processing only needs to be carried out on the recognized undeletable file instead of carrying out virus scanning processing on any file, the efficiency of virus recognition can be effectively improved.

In addition, by using the technical solutions provided by the present invention, by means of deleting, according to erroneous alarm information about any one file, the size of the one file and feature data of the one file from the recognition data to avoid continuing to directly delete the one file subsequently, the reliability of virus recognition can be effectively improved.

It shall be noted that, regarding the foregoing method embodiments, for the sake of simple description, the methods are described as a series of action combinations, but those of ordinary skill in the art shall know that the present invention is not limited to the action sequence described, because according to the present invention, some steps may be performed in other sequences or performed simultaneously. Secondly, those skilled in the art shall also know that the embodiments described in the description are all preferred embodiments, and the actions and modules involved are not necessarily required in the present invention.

In the embodiments above, the description of each embodiment has its own emphasis, and for a part that is not detailed in a certain embodiment, reference can be made to the relevant description of other embodiments.

FIG. 2 is a structural schematic diagram of an apparatus for processing a file provided in another embodiment of the present invention, as shown in FIG. 2. The apparatus for processing a file in this embodiment may comprise an acquisition unit 21, a recognition unit 22 and a scanning unit 23. The acquisition unit 21 is used for acquiring a target file to be scanned; the recognition unit 22 is used for using recognition data of a deletable file to recognize the target file, so as to obtain a recognition result, the recognition result comprising the target file being a deletable file or the target file being an undeletable file; and the scanning unit 23 is used for deleting the deletable file according to the recognition result.

It shall be noted that the apparatus for processing a file provided in this embodiment may be an application located in a local terminal, or may also be a functional unit such as a plug-in or a software development kit (SDK) arranged in the application located in the local terminal, or may also be a processing engine located in a network-side server; this is not particularly limited in this embodiment.

It can be understood that the application may be a native program (nativeAPP) installed on a terminal, or may also be a webpage program (webAPP) of a browser on the terminal, and may take any objective form capable of implementing virus scanning of a file to provide a safe system environment; this is not particularly defined in this embodiment.

Optionally, in a possible implementation of this embodiment, the target file acquired by the acquisition unit 21 may be an executable file. Specifically, the executable file is a file of a portable executable (PE) file format, and may also be loaded into a memory and executed by a loading program of an operating system. The filename extension of the executable file may comprise but is not limited to .exe, .sys, .scr, etc.

Optionally, in a possible implementation of this embodiment, the target file acquired by the acquisition unit 21 may be a non-executable file. Specifically, a non-executable file is a file that is not an executable file.

Optionally, in one possible implementation of this embodiment, the scanning unit 23 may also be further used for carrying out virus scanning processing on the non-executable file according to the recognition result.

Optionally, in a possible implementation of this embodiment, the recognition unit 22 may also be further used for acquiring a deletion instruction triggered by a user, the deletion instruction used to instruct the deletion of a virus file, and obtaining the size of the virus file and the feature data of the virus file according to the virus file, to serve as the recognition data of the deletable file.

Optionally, in a possible implementation of this embodiment, the recognition unit 22 may be specifically used for acquiring the size of the target file; acquiring feature data of the content of a designated portion of the target file if the size of the target file successfully matches with the size of a file in the recognition data; acquiring feature data of all the contents of the target file if the feature data of the content of the designated portion of the target file successfully matches with feature data of the content of a designated portion of the file in the recognition data; and obtaining the recognition result that the target file is a deletable file if the feature data of all the contents of the target file successfully matches with the feature data of all the contents of the file in the recognition data.

Specifically, the recognition unit 22 may be specifically used for using a first Hash algorithm, for example, an algorithm such as a cyclical redundancy check 32 (CRC32) algorithm, Adler32 or a message digest algorithm 4 (MD4), to acquire feature data of the beginning M bytes of the target file, M being an integer greater than or equal to 1.

Specifically, the recognition unit 22 may be specifically used for using a second Hash algorithm, for example, an algorithm such as a message digest algorithm 5 (MD5) or a secure Hash algorithm 256 (SHA256), to acquire feature data of all the contents of the target file.

Furthermore, the recognition unit 22 may also be further used for obtaining the recognition result that the target file is an undeletable file if the size of the target file fails to match with the size of the file in the recognition data.

Furthermore, the recognition unit 22 may also be further used for obtaining the recognition result that the target file is an undeletable file if the feature data of the content of the designated portion of the target file fails to match with the feature data of the content of the designated portion of the file in the recognition data.

Furthermore, the recognition unit 22 may also be further used for obtaining the recognition result that the target file is an undeletable file if the feature data of all the contents of the target file fails to match with the feature data of all the contents of the file in the recognition data.

Optionally, in a possible implementation of this embodiment, the recognition unit 22 may also be further used for deleting, according to erroneous alarm information about any one file, the size of the one file and feature data of the one file from the recognition data. Thus, by means of deleting, according to erroneous alarm information about any file, the size of the one file and feature data of the one file from the recognition data to avoid continuing to directly delete the one file subsequently, the reliability of virus recognition can be effectively improved.

It shall be noted that the method in the embodiment corresponding to FIG. 1 may be implemented by the apparatus for processing a file provided in this embodiment. Reference may be made to relevant contents in the embodiment corresponding to FIG. 1 for a detailed description, which will not be repeated here.

In this embodiment, by means of acquiring, via an acquisition unit, a target file to be scanned and then using, via the recognition unit, recognition data of a deletable file to recognize the target file, so as to obtain a recognition result, the recognition result comprising that the target file is a deletable file, the target file is an undeletable file or the target file is an unknown file, the scanning unit is enabled to delete the deletable file according to the recognition result. Since the recognized deletable file can be directly deleted without the need to perform virus scanning processing thereon and then pop up a corresponding alarm prompt regarding a confirmed virus file to remind a user to delete the virus file, the occupation of system resources of a terminal can be reduced, thereby improving the processing performance of the terminal.

In addition, by using the technical solutions provided by the present invention, since the recognized deletable file can be directly deleted without the need to perform virus scanning processing thereon and then pop up a corresponding alarm prompt regarding a confirmed virus file to remind a user to delete the virus file, frequent popping up of the same alarm prompt can be avoided.

In addition, by using the technical solutions provided by the present invention, since virus scanning processing only needs to be carried out on the recognized undeletable file instead of carrying out virus scanning processing on any file, the efficiency of virus recognition can be effectively improved.

In addition, by using the technical solutions provided by the present invention, by means of deleting, according to erroneous alarm information about any one file, the size of the one file and feature data of the one file from the recognition data to avoid continuing to directly delete the one file subsequently, the reliability of virus recognition can be effectively improved.

It may be clearly understood by those of ordinary skill in the art that, for the purpose of convenient and brief description, for a detailed working process of the foregoing system, apparatus and unit, reference may be made to the corresponding process in the method embodiments, which will not be detailed again here.

In a few embodiments provided in the present invention, it shall be understood that the disclosed system, apparatus and method may be implemented in other manners. For example, the apparatus embodiments described above are merely illustrative, for example, the division of the units is merely a logical function division, and there may be other ways of dividing the units in actual implementation, for example, a plurality of units or components may be combined or may be integrated into another system, or some features may be omitted, or not carried out. Another point is that a coupling or direct coupling or communication connection shown or discussed may be an indirect coupling or a communication connection via some interfaces, apparatuses, or units, and may be electrical, mechanical, or in other forms.

The units described as separated components may or may not be physically separated, and components displayed as units may or may not be physical units, that is, may be located in one position, or may also be distributed on a plurality of network elements. Some or all of the units may be selected according to actual needs to achieve the objectives of the solutions of the present embodiments.

In addition, various functional units in various embodiments of the present invention may be integrated into one processing unit, or each of the units may also exist alone physically, or two or more units may be integrated into one unit. The integrated unit above may be implemented in the form of hardware or may also be implemented in the form of hardware with software functional units.

The integrated unit above implemented in the form of software functional units may be stored in a computer readable storage medium. The software functional units are stored in a storage medium and include several instructions for enabling a computer device (which can be a personal computer, a server, or a network device and so on) or a processor to execute some steps of the method described in the embodiments of the present invention. The foregoing storage medium comprises: various media that may store program codes, such as a USB flash drive, a removable hard disk, a read-only memory (ROM), a random access memory (RAM), a magnetic disk, or an optical disk.

It shall be noted finally that the embodiments above are merely used for illustrating the technical solutions of the present invention rather than limiting same; although the present invention is described in detail with reference to the foregoing embodiments, those of ordinary skill in the art shall understand that they may still make modifications to the technical solutions stated in the foregoing various embodiments or make equivalent replacements of some technical features thereof; and these modifications or replacements shall not result in the essence of the corresponding technical solutions departing from the spirit and scope of the technical solutions of various embodiments of the present invention.

What is claimed is:

1. A method for processing a file via one or more processors of a computer device, comprising:

recording identification data of one or more deletable files into a database, said recording comprising providing an alarm that a file contains a virus, acquiring a deletion instruction triggered by a user to delete the file in response to the alarm, recognizing the file as being deletable, and listing identification data of the file in the database;

acquiring a target file to be scanned, the target file being stored on a storage device of the computer device;

using the identification data of the one or more deletable files to identify the target file to obtain an identification result;

wherein the identification result is the target file being deletable upon a determination that identification data of the target file matches identification data of a selected deletable file in the database;

wherein the identification result is the target file being undeletable upon a determination that the identification data of the target file does not match identification data of any deletable file in the database; and deleting the target file from the storage device according to the identification result that the target file is deletable, without providing an alarm prompt to remind the user to delete the target file, wherein said using the identification data includes:

acquiring a size of the target file;

acquiring selected feature data of content from a predetermined portion of the target file based upon a determination that the size of the target file matches a size of the selected deletable file of the one or more deletable files in the identification data;

acquiring feature data of all of the content of the target file based upon a determination that the selected feature data of the target file matches feature data of content from a predetermined portion of the selected deletable file; and obtaining the identification result that the target file is deletable based upon a determination that the feature data of all of the content from the target file matches the feature data of all of the content from the selected deletable file.

2. The method of claim 1, further comprising performing virus scanning processing on the target file according to the identification result that the target file is undeletable after said using the identification data.

3. The method of claim 1, further comprising:

acquiring the deletion instruction for instructing deletion of a confirmed virus file in response to a user input; and obtaining a size of the confirmed virus file and feature data of the confirmed virus file to serve as identification data of the confirmed virus file and to be included in the database, wherein said acquiring the deletion instruction and said obtaining the size of the confirmed virus file and the feature data of the confirmed virus file occur before said using the identification data.

4. The method of claim 1, wherein said using the identification data further comprises:

obtaining the identification result that the target file is undeletable based upon a determination that the size of the target file does not match the size of any deletable file in the database;

obtaining the identification result that the target file is undeletable based upon a determination that the selected feature data of the content of the predetermined portion of the target file does not match the feature data of the content of the predetermined portion of any deletable file in the database;

obtaining the identification result that the target file is undeletable based upon a determination that the feature data of all of the content of the target file does not match the feature data of all of the content of any deletable file in the database; or a combination thereof.

5. The method of claim 1, further comprising:

receiving erroneous alarm information indicating a deletable file in the database is erroneously recognized as containing a virus;

deleting a size of the indicated deletable file and feature data of the indicated deletable file from the identification data based upon said receiving, wherein said receiving the erroneous alarm information and said deleting the size of the indicated deletable file each occur before said using the identification data.

6. The method of claim 1, wherein said determination that the selected feature data of the target file matches the feature data of the content from the predetermined portion of the selected deletable file in the identification data includes acquiring feature data of a predetermined number of beginning bytes of the target file using a first Hash process based upon the determination that the size of the target file matches the size of the selected deletable file.

7. The method of claim 1, wherein said acquiring the feature data of all of the content of the target file includes acquiring the feature data of all of the content of the target file using a second Hash process based upon the determination that the feature data of the content of the predetermined portion of the target file matches the feature data of the content of the predetermined portion of the selected deletable file.

8. The method of claim 1, wherein the target file comprises an executable file, a non-executable file or a combination thereof.

9. A non-transitory computer-readable storage medium including one or more programs for processing a file on a computer device when implemented by one or more processors of the computer device, the one or more programs comprising:

instruction for recording identification data of one or more deletable files into a database, said instruction for recording comprising instruction for providing an alarm that a file contains a virus, instruction for acquiring a deletion instruction triggered by a user to delete the file in response to the alarm, instruction for recognizing the file as being deletable, and instruction for listing identification data of the file in the database;

instruction for acquiring a target file to be scanned;

instruction for using the identification data of the one or more deletable files to identify the target file to obtain an identification result;

wherein the identification result is the target file being deletable upon a determination that identification data of the target file matches identification data of a selected deletable file in the database;

wherein the identification result is the target file being undeletable upon a determination that the identification data of the target file does not match identification data of any deletable file in the data;

instruction for deleting the target file according to the identification result that the target file is deletable, without providing an alarm prompt to remind the user to delete the target file, wherein said instruction for using the identification data includes:

instruction for acquiring a size of the target file;

instruction for acquiring selected feature data of content from a predetermined portion of the target file based upon a determination that the size of the target file matches a size of the selected deletable file of the one or more deletable files in the identification data;

instruction for acquiring feature data of all of the content of the target file based upon a determination that the selected feature data of the target file matches feature data of content from a predetermined portion of the selected deletable file; and instruction for obtaining the identification result that the target file is deletable based upon a determination that the feature data of all of the content from the target file matches the feature data of all of the content from the selected deletable file.

10. The non-transitory computer-readable storage medium of claim 9, wherein the one or more programs further comprise:

instruction for deleting a confirmed virus file in response to a user input; and instruction for obtaining a size of the confirmed virus file and feature data of the confirmed virus file to serve as identification data of the confirmed virus file and to be included in the database.

11. An apparatus for processing a file, comprising:

a hardware processor configured for:

recording identification data of one or more deletable files into a database, said recording comprising providing an alarm that a file contains a virus, acquiring a deletion instruction triggered by a user to delete the file in response to the alarm, recognizing the file as being deletable, and listing identification data of the file in the database;

acquiring a target file to be scanned;

using the identification data of the one or more deletable files to identify the target file, so as to obtain an identification result;

wherein the identification result is the target file being deletable upon a determination that identification data of the target file matches identification data of a selected deletable file in the database;

wherein the identification result is the target file being undeletable upon a determination that the identification data of the target file does not match identification data of any deletable file in the database; and deleting the target file according to the identification result that the target file is deletable, without providing an alarm prompt to remind the user to delete the target file, wherein the hardware processor is configured for:

acquiring a size of the target file;

acquiring selected feature data of content from a predetermined portion of the target file based upon a determination that the size of the target file matches a size of the selected deletable file of the one or more deletable files in the identification data;

acquiring feature data of all of the content of the target file based upon a determination that the selected feature data of the target file matches feature data of content from a predetermined portion of the selected deletable file; and obtaining the identification result that the target file is deletable based upon a determination that the feature data of all of the content from the target file matches the feature data of all of the content from the selected deletable file.

12. The apparatus of claim 11, wherein said hardware processor is configured for performing virus scanning processing on the target file according to the identification result that the target file is undeletable.

13. The apparatus of claim 11, wherein said hardware processor is configured for:

acquiring the deletion instruction triggered by a user, the deletion instruction being used to instruct deletion of a confirmed virus file; and obtaining a size of the virus file and feature data of the virus file to serve as identification data of the confirmed virus file and to be included in the database.

14. The apparatus of claim 11, wherein said hardware processor is configured for:

obtaining the identification result that the target file is undeletable based upon a determination that the size of the target file does not match the size of any deletable file in the database;

obtaining the identification result that the target file is undeletable based upon a determination that the selected feature data of the content of the predetermined portion of the target file does not match the feature data of the content of the predetermined portion of any deletable file in the database;

obtaining the identification result that the target file is undeletable based upon a determination that the feature data of all of the content of the target file does not match the feature data of all of the content of any deletable file in the database; or a combination thereof.

15. The apparatus of claim 11, wherein said hardware processor is configured for:

receiving erroneous alarm information indicating a deletable file in the database is erroneously recognized as containing a virus; and deleting a size of the indicated deletable file and feature data of the indicated deletable file from the identification data based upon the erroneous alarm information.

16. The apparatus of claim 11, wherein said hardware processor is specifically used for acquiring feature data of a predetermined number of beginning bytes of the target file using a first Hash process based upon the determination that the size of the target file matches the size of the selected deletable file in the identification data.

17. The apparatus of claim 11, wherein said hardware processor is specifically used for acquiring the feature data of all of the content of the target file using a second Hash process based upon the determination that the feature data of the content of the predetermined portion of the target file matches the feature data of the content of the predetermined portion of the selected deletable file in the identification data.

18. The apparatus of claim 11, wherein the target file comprises an executable file, a non-executable file or a combination thereof.

* * * * *